United States Patent
Miyahara (10) Patent No.: US 7,149,480 B2
(45) Date of Patent: Dec. 12, 2006

(54) RECEIVER DEVICE

(75) Inventor: Yutaka Miyahara, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 755 days.

(21) Appl. No.: 09/987,963

(22) Filed: Nov. 16, 2001

(65) Prior Publication Data

US 2002/0058488 A1 May 16, 2002

(30) Foreign Application Priority Data

Nov. 16, 2000 (JP) .............................. 2000-349417

(51) Int. Cl.
*H04B 1/44* (2006.01)

(52) U.S. Cl. ..................... 455/78; 455/254; 455/217; 455/272

(58) Field of Classification Search ................ 455/254, 455/217, 272, 277.1, 277.2, 78
See application file for complete search history.

(56) References Cited

U.S. PATENT DOCUMENTS 6,018,651 A * 1/2000 Bruckert et al. ......... 455/277.1
6,188,879 B1 * 2/2001 Imamura .................. 455/277.1
6,278,869 B1 * 8/2001 Lindenmeier et al. ... 455/277.1
6,289,036 B1 * 9/2001 Saito et al. ................. 375/130
6,330,433 B1 * 12/2001 Jager ....................... 455/277.2
6,571,090 B1 * 5/2003 Moriyama et al. ....... 455/277.1

FOREIGN PATENT DOCUMENTS

JP       411225099 A  *  2/1998
JP        10093503 A  *  4/1998

* cited by examiner

*Primary Examiner*—Matthew D. Anderson
*Assistant Examiner*—Tuan Pham
(74) *Attorney, Agent, or Firm*—Arent Fox PLLC (57) ABSTRACT

A receiver device for receiving incoming radio waves by using a plurality of antennas, which is capable of improving the maximum input sensitivity is provided. In the receiver device, a switching unit switches to an antenna having the lower antenna gain as a new receiving antenna on the precondition that when receiving incoming radio waves by one particular antenna currently set as the receiving antenna, if a reception level of this particular antenna becomes a level close to the maximum input sensitivity of a signal processing unit, then the reception condition is satisfactory. Consequently, it is possible to improve the maximum input sensitivity and forestall the occurrence of waveform distortion and the like.

4 Claims, 4 Drawing Sheets

RECEIVER DEVICE

BACKGROUND OF THE INVENTION

The present invention relates to a receiver device for receiving incoming radio waves by using a plurality of antennas.

The present application claims priority from Japanese Application No. 2000-349417, the disclosure of which is incorporated herein by reference for all purposes.

Conventionally, a receiver device using a diversity technique has been known as a receiver device for receiving incoming radio waves by a plurality of antennas. The conventional receiver device maintains a satisfactory reception condition by successively selecting, among a plurality of antennas, an antenna with which the greatest reception level can be obtained.

However, there has been a problem associated with the above conventional receiver device for successively selecting an antenna with which the greatest reception level can be obtained. For example, when the receiver device receives strong incoming radio waves, a decoded reproduction signal often causes noises, waveform distortion, or an instantaneous interruption known as sound cutting.

SUMMARY OF THE INVENTION

The present invention therefore has an object to provide a receiver device capable of maintaining a more satisfactory reception condition by overcoming the above conventional problem.

According to the present invention, there is provided a receiver device comprising: a plurality of antennas having different antenna gains; an antenna switching device for selecting one of reception signals received by the plurality of antennas, and supplying the selected reception signal to a signal processor arranged subsequent to the antenna switching device; a detector for detecting the level of a reception signal from each antenna; a controller for controlling the antenna switching device for selecting a reception signal having a lower level than a maximum input level of the signal processor, in accordance with detection result from the detector.

In one aspect of the invention, the controller has a judger for judging a reception state of each antenna; and when there are a plurality of antennas capable of receiving signals without any troubles, the antenna switching device is controlled so as to select a reception signal from an antenna having a low antenna gain.

In another aspect of the invention, the plurality of antennas are located close to one another, the controller operates to control the antenna switching device, in a manner such that once the level of a reception signal supplied to the signal processor approaches a maximum input level of the signal processor, an antenna having a lower antenna gain than that of an antenna being selected is selected.

In a further aspect of the invention, the controller operates to control the antenna switching device, in a manner such that once the level of a reception signal supplied to the signal processor becomes lower than a predetermined level, an antenna having a higher antenna gain than that of an antenna being selected is selected.

In a still further aspect of the invention, the controller operates to control the antenna switching device, in a manner such that once a reception signal of each antenna becomes lower than a predetermined level, a reception signal from an antenna having a high antenna gain is selected, and that when there are plurality of reception signals having a higher level than the predetermined level, a reception signal from an antenna having a low antenna gain is selected.

According to the receiver device of the present invention arranged in the above manner, the receiver device switches to an antenna having the lower antenna gain as a new receiving antenna, on the precondition that when receiving incoming radio waves by one particular antenna currently set as the receiving antenna, if a reception level of this particular antenna becomes a reception signal level close to the maximum input sensitivity of the signal processing means, then the reception condition is satisfactory. Consequently, the maximum input sensitivity can be improved while a satisfactory reception condition is maintained. For example, in a case where incoming radio waves are received by a plurality of antennas (provided for specific kinds of radio waves having different patterns, such as different polarization characteristics), by switching to an antenna (having a low antenna gain) different from a specific antenna receiving the arriving radio waves, it is possible to improve the maximum input sensitivity and forestall the occurrence of waveform distortion and the like.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENT

Figure 1:
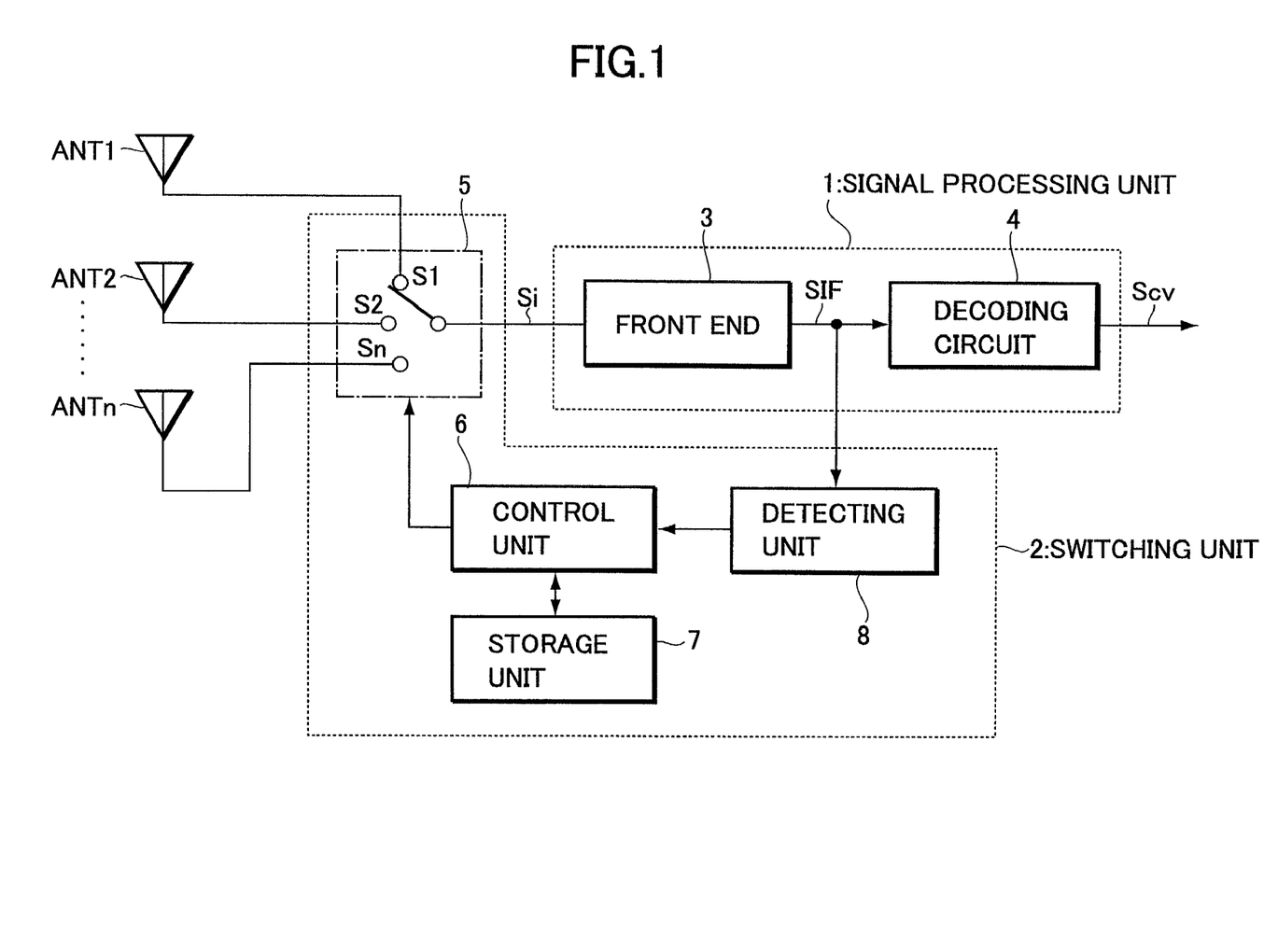
FIG. 1 is a block diagram illustrating an arrangement of one embodiment of a receiver device according to the present invention.

A preferred embodiment will be described in detail hereinafter with reference to the accompanying drawings. FIG. 1 is a block diagram illustrating an arrangement of a receiver device of the present embodiment.

Referring to the drawing, the present receiver device is a receiver device for receiving incoming radio waves by using n antennas ANT1, ANT2, . . . ANTn, and is composed of a signal processing unit 1 and a switching unit 2.

Herein, the antennas ANT1, ANT2, . . . ANTn are located at different places and have different antenna gains. For example, in case of a receiver device equipped with a car audio system mounted on a vehicle and using diversity antennas, the antennas ANT1, ANT2, . . . ANTn are located at different spots of the vehicle.

The signal processing unit 1 includes a front end 3 for receiving one of reception signals Si outputted from the antennas ANT1, ANT2, . . . ANTn and for converting the same into an intermediate frequency signal SIF applicable to signal processing, and a decoding circuit 4 for decoding the intermediate frequency signal SIF outputted from the front end 3 so that an original signal Scv is restored, etc.

The switching unit 2 includes a switching element 5 for switching reception signals Si outputted from the antennas ANT1, ANT2, . . . ANTn to the front end 3, a control unit 6 for controlling the switching operation of the switching element 5, a storage unit 7 composed of a semiconductor memory or the like, and a detecting unit 8 for detecting a level of the intermediate frequency signal SIF outputted from the front end 3.

In the present embodiment, the detecting unit 8 detects an output signal level of the front end 3 as reception levels of the antennas ANT1, ANT2, . . . ANTn. It should be appreciated, however, that the detecting unit 8 may detect an input signal level of the front end 3 or an output signal level of the decoding circuit 4. In short, as long as the detecting unit 8 can detect levels of the respective reception signals outputted from the antennas ANT1, ANT2, . . . ANTn either directly or indirectly, it can be arranged so as to detect a signal level other than the output signal level of the front end 3.

The control unit 6 receives a reception level (detection result) detected by the detecting unit 8, and judges whether the current reception condition is stable or not through optimization processing which will be discussed below. In case that the reception condition is stable, the control unit 6 determines which of the antennas ANT1, ANT2, . . . ANTn is suited to attain the maximum input sensitivity of the receiver device, and controls the switching operation of the switching element 5.

The storage unit 7 pre-stores management data representing a correlation between the antennas ANT1, ANT2, . . . ANTn and switching contacts S1, S2, . . . Sn of the switching element 5, predetermined threshold data THD1 and THD2 which the control unit 6 uses as a criterion when performing an optimization process, as well as data representing antenna gains of the respective antennas ANT1, ANT2, . . . ANTn.

Figure 2:
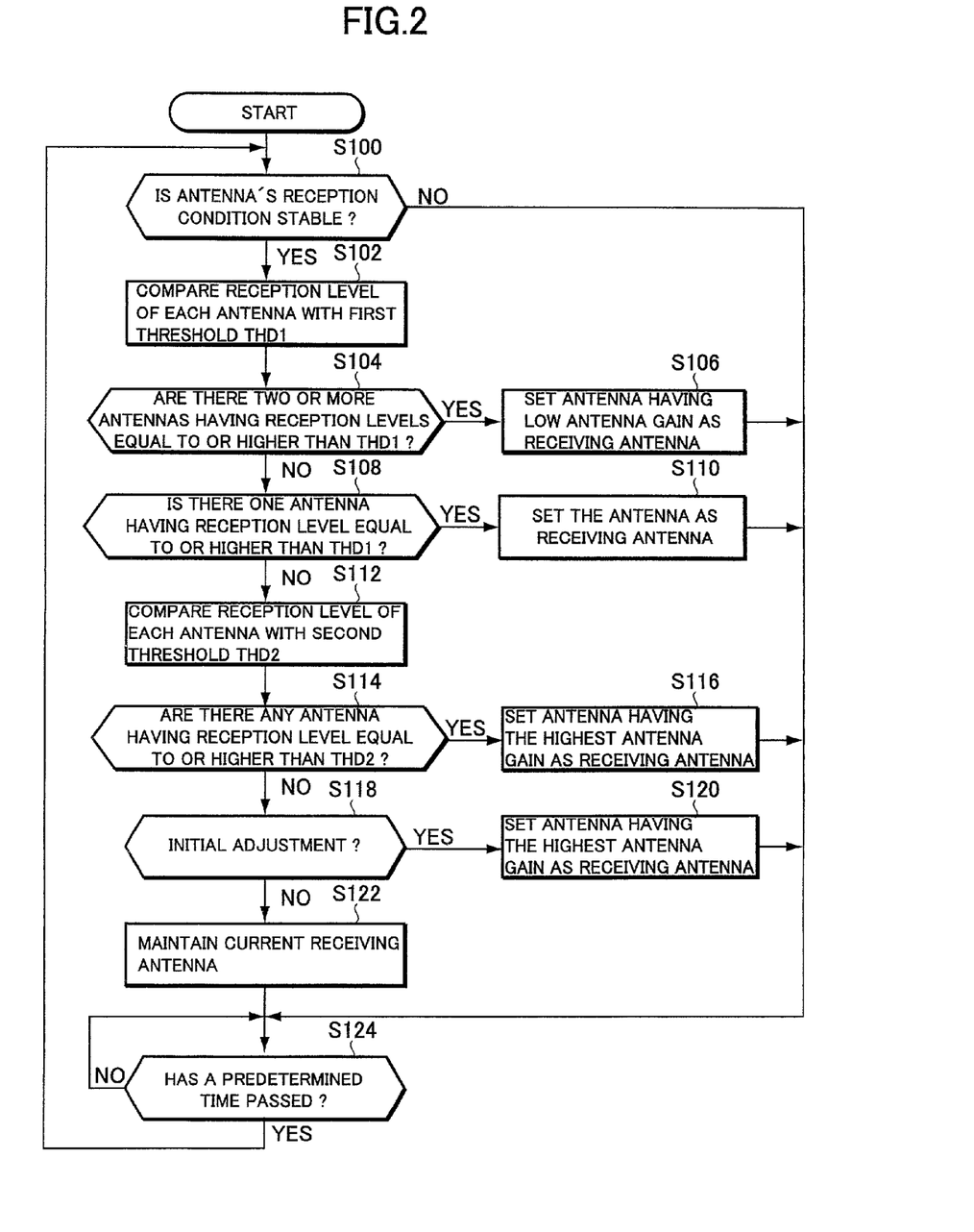
FIG. 2 is a flowchart explaining an operation of the receiver device of FIG. 1 when performing optimization processing.

Next, the following description will describe an operation of the present receiver device when performing the optimization processing with reference to the flowchart of FIG. 2. Assume that, for ease of explanation, the antenna ANT1 has the highest antenna gain, and the antenna ANT2 has the second highest antenna gain, and the same applies to the following antennas, so that the antenna ANTn has the lowest antenna gain.

The present receiver device is activated when the user or the like turns on the power thereof, and in first Step S100, the control unit 6 controls the switching element 5 to sequentially switch to the switching contacts S1 through Sn, while the detecting unit 8 detects the reception levels of the respective antennas ANT1, ANT2, . . . ANTn. Further, the control unit 6 examines the detection result from the detecting unit 8 to judge whether the reception condition is stable or not.

Herein, in a case where outputs from at least two antennas out of the antennas ANT1, ANT2, . . . ANTn are stable at a predetermined level, the control unit 6 determines that the reception condition is stable. Otherwise, the control unit 6 determines that the reception condition is unstable. Hence, in a case where an output from one antenna is stable at the predetermined level but outputs from the rest of the antennas vary significantly in a short time, the control unit 6 determines that the reception condition is unstable.

Upon determining that the reception condition is unstable (in case of NO), the control unit 6 skips to Step S124 without performing the optimization processing, and repeats the procedure starting from Step S100 when a predetermined time set in advance has passed.

On the other hand, upon determining that the reception condition is stable in Step S100 (in case of YES), the control unit 6 proceeds to Step S102 and steps afterwards to select an optimal antenna.

In Step S102, the control unit 6 compares the reception levels of the respective antennas ANT1, ANT2, . . . ANTn detected in Step S100 with the first threshold THD1, and in following Step S104, the control unit 6 determines whether there are two or more antennas having the reception levels higher than the first threshold THD1. Herein, in a case where satisfactory audio reproduction or video reproduction is possible by a reproduction signal Scv outputted from the signal processing unit 1, the first threshold THD1 is set to a level higher than the lowest among the reception levels of the respective antennas ANT1, ANT2, . . . ANTn. In other words, the first threshold THD1 is set to a level higher than a reception level at which, of all the reception powers extracted from the respective antennas ANT1, ANT2, . . . ANTn (using the signal processing unit 1 as a load), the lowest reception power allowing satisfactory audio reproduction or video reproduction is achieved. In fact, the first threshold THD1 is predetermined empirically.

In case that the control unit 6 detects two or more antennas having the reception levels higher than the first threshold THD1 (in case of YES), the control unit 6 proceeds to S106, and judges the antenna having the lowest antenna gain among the detected antennas as an optimal receiving antenna. Then, the control unit 6 controls the switching operation of the switching element 5 so as to switch over to the switching contact connected to the receiving antenna judged as the optimal antenna, after which the control unit 6 skips to Step S124.

In other words, in Steps S102, S104, and S106, among two or more antennas having the reception levels higher than the first threshold THD1, the antenna having the lowest antenna gain is judged, and the antenna thus judged is selected as the receiving antenna. For example, in a case where the antennas ANT1 and ANT2 have the reception levels higher than the first threshold THD1, the antenna ANT2 having the lower antenna gain than the antenna ANT1 is selected.

By selecting the antenna (for example, ANT2) having a low antenna gain as the receiving antenna in this manner, reception efficiency is lowered than by receiving incoming radio waves with the antenna (for example, ANT1) having a high antenna gain. For this reason, a level of an input signal to the signal processing unit 1 from the receiving antenna is lowered by a decrease of the reception efficiency, which makes it possible to improve the maximum input sensitivity of the receiver device. In other words, in a case where the antenna (for example, ANT1) having a high antenna gain is selected as the receiving antenna, a reception signal having a higher level than a maximum input level is supplied to the signal processing unit 1 when incoming radio waves become stronger, which causes so-called waveform distortion or the like. On the contrary, by selecting the antenna (for example, ANT2) having a low antenna gain as the receiving antenna, a reception signal having an adequate level is supplied to the signal processing unit 1 even when incoming radio waves become stronger, which makes it possible to improve the maximum input sensitivity of the receiver device. Here, the maximum input level is a maximum level of an input signal which can be processed by the signal processing unit 1.

Next, in Step S104, in the case where less than two antenna has the reception level higher than the first threshold THD1 (in case of NO), the control unit 6 proceeds to Step S108, and determines whether one antenna has the reception level higher than the first threshold THD1. In the case of one antenna (in case of YES), the control unit 6 proceeds to Step S110, and switches the switching element 5 to select that one particular antenna as the receiving antenna, after which the control unit 6 skips to S124.

On the other hand, at Step S108, in the case where there is no antenna having the reception level higher than the first threshold THD1 (in case of NO), the control unit 6 proceeds to S112, and compares the reception levels of the respective antennas ANT1, ANT2, ... ANTn with the second threshold THD2. Here, in the case where satisfactory audio reproduction or video reproduction is possible by a reproduction signal outputted from the signal processing unit 1,the second threshold THD2 is set to a level equal to the lowest among the reception levels of the respective antennas ANT1, ANT2, ... ANTn. In other words, the first threshold THD2 is set to a level higher than a reception level at which, of all the reception powers extracted from the respective antennas ANT1, ANT2, ... ANTn (using the signal processing unit 1 as a load), the lowest reception power allowing satisfactory audio reproduction or video reproduction is achieved. In fact, the first threshold THD2 is predetermined empirically. Hence, a relation between the first threshold THD1 and the second threshold THD2 is expressed as: THD1>THD2.

Then, the control unit 6 proceeds to Step S114, and determines whether there is any antenna having a reception level equal to or higher than the second threshold THD2. When the presence of one or more such antennas is present (in case of YES), the control unit 6 proceeds to Step S116, and selects, as the receiving antenna, an antenna having the highest antenna gain among the antennas having the reception levels equal to or higher than the second threshold THD2. Then, the control unit 6 switches the switching element 5, so that a reception signal will be supplied to the signal processing unit 1 from the receiving antenna thus selected. Subsequently, the control unit 6 skips to S124.

At Step S114, in the case where there is no antenna having the reception level equal to or higher than the second threshold THD2 (in case of NO), the control unit 6 proceeds to Step S118, and determines whether it is an initial adjustment or not. In other words, the control unit 6 judges whether the optimization process for selecting the optimal antenna has been performed for the first time since the power was turned on. If this is the first time, the control unit 6 proceeds to Step S120, and switches the switching element 5, so that the antenna having the highest antenna gain among the antennas ANT1, ANT2, ... ANTn is selected as the receiving antenna, after which the control unit 6 skips to Step S124.

On the other hand, in the case where it is not judged as the initial adjustment at Step S118 (in case of NO), the control unit 6 proceeds to Step S122, and maintains the currently selected receiving antenna as the receiving antenna, after which the control unit 6 proceeds to Step S124.

At Step S124, the control unit 6 judges a lapse of a predetermined time to periodically perform the optimization process at Steps S100 through S122, and repeats the procedure from Step S100.

As has been discussed, the receiver device of the present embodiment is arranged in such a manner that, when a stable reception condition is achieved and a reception level higher than the first threshold THD1 is obtained, the receiver device determines it is in a condition where there is a good possibility of receiving a reception signal having a higher level, whereby the receiver device at first selects an antenna having a low antenna gain (low gain antenna) and selects the same as the receiving antenna. As a result, because an antenna with low reception efficiency is selected, the maximum input sensitivity of the receiver device can be improved, thereby allowing the signal processing unit 1 to reproduce a signal which will not cause noises, waveform distortion, sound cutting, etc.

Also, in the case where there is no antenna having a reception level higher than the first threshold THD1, the receiver device of the present embodiment checks the presence or absence of an antenna having a reception level higher than the second threshold THD2, and by selecting an antenna having the highest antenna gain (high gain antenna) among the antennas having reception levels higher than the second threshold THD2, it is possible to maintain a satisfactory reception condition.

Further, in the case where there is no antenna having a reception level higher than the second threshold THD2, by selecting an antenna having the highest antenna gain among the antennas ANT1, ANT2, ... ANTn, it is possible to maintain a satisfactory reception condition.

As has been discussed, according to the present receiver device, the maximum input sensitivity can be improved while a satisfactory reception condition is maintained. Hence, for example, in the event of receiving strong incoming radio waves near a transmitting antenna of a broadcast station, it is possible to prevent a supply of a reception signal having a high level to the signal processing unit 1.

In the flowchart of FIG. 2, whether the current reception condition is stable or not is determined first in Step S100, and then an optimal antenna which can improve the maximum input sensitivity is selected. However, it may be arranged in a reversed manner, so that an antenna which can improve the maximum input sensitivity is selected as a candidate for a receiving antenna, and then, if a reception condition is stable when incoming radio waves are received by the candidate antenna, the candidate antenna is selected as an actual receiving antenna.

Also, the above description described a case where the process for determining whether the current reception condition is stable or not and the process for selecting an optimal antenna (which can improve the maximum input sensitivity) are performed separately. However, it is also possible that the first threshold THD1 and second threshold THD2 are pre-set to levels at which a reception condition becomes stable and the maximum input sensitivity can be improved. Setting the levels of the first threshold THD1 and second threshold THD2 in this manner can omit the process in Step S100, thereby making it possible to accelerate the optimization process.

Also, the receiver device of the present embodiment may be arranged in such a manner that a plurality of antennas ANT1, ANT2, ... ANTn are incorporated into the receiver device, or optional antennas ANT1, ANT2, ... ANTn are detachably connected to the receiver device through the switching contacts S1, S2, ... Sn of the switching element 5.

Figure 3:
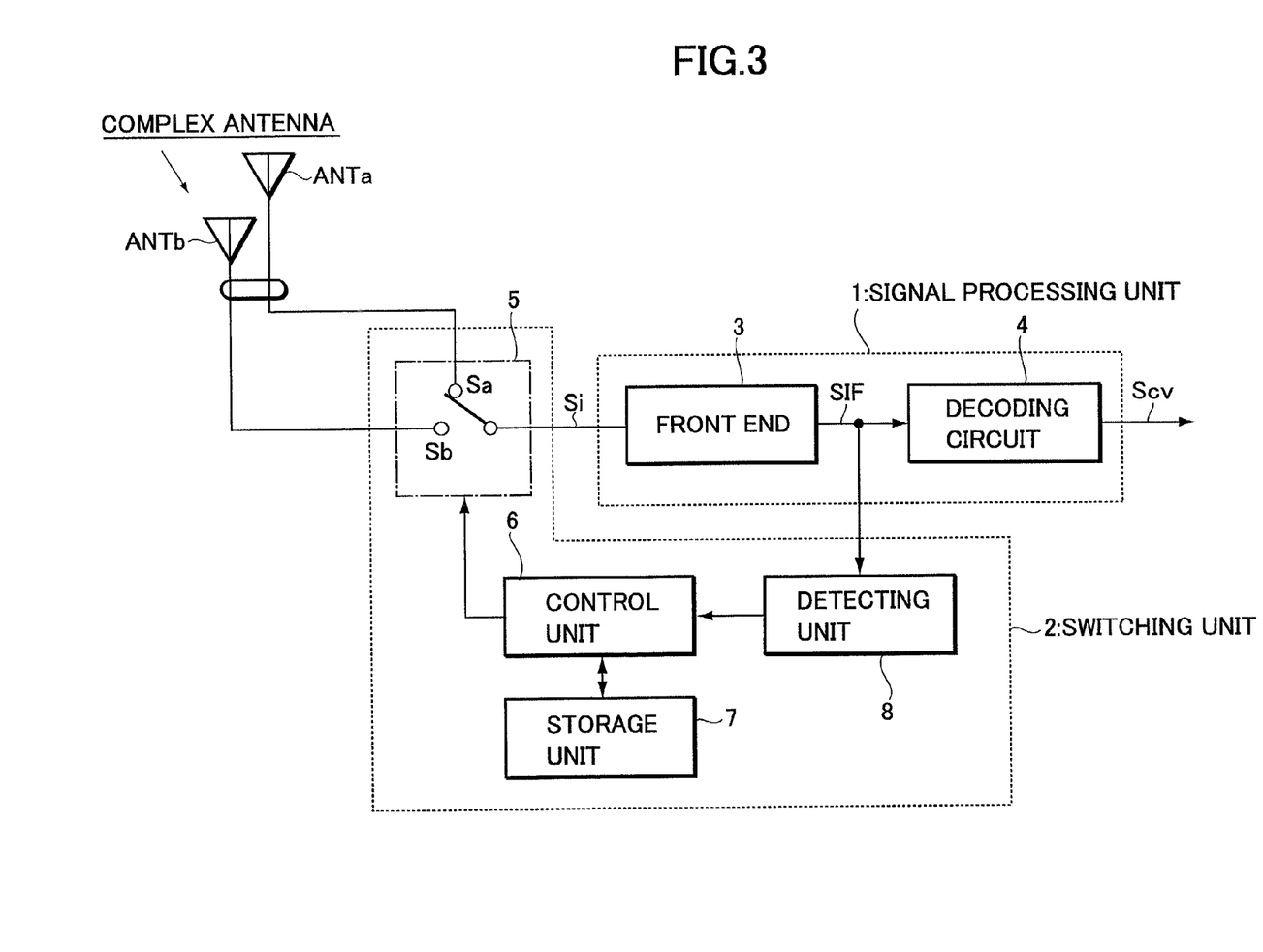
FIG. 3 is a block diagram illustrating an arrangement of a modified example of the receiver device according to the present invention.
Figure 4:
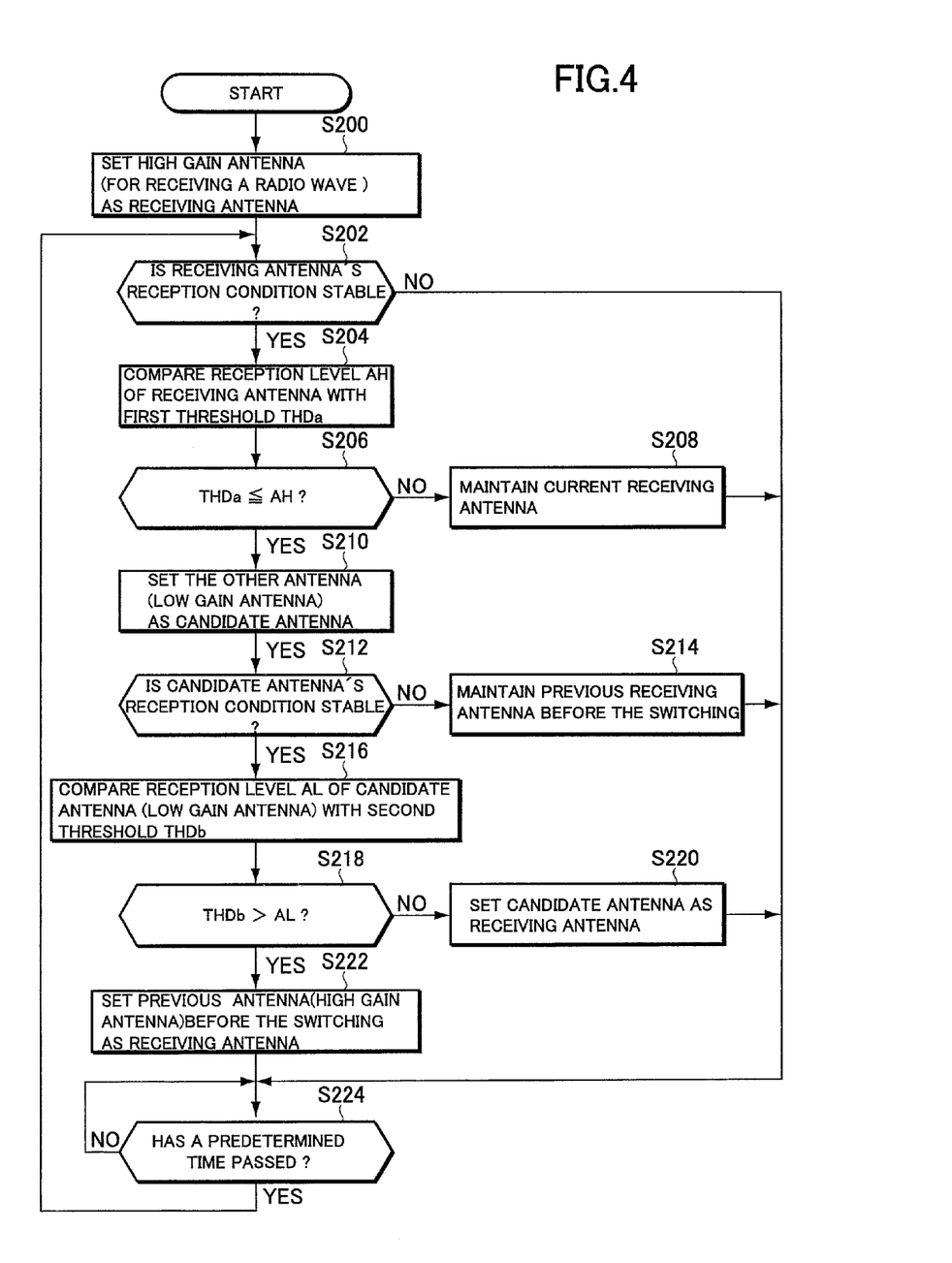
FIG. 4 is a flowchart explaining an operation of the receiver device of FIG. 3 when performing optimization processing.

Next, the following description will describe a modified example of the present embodiment with reference to FIGS. 3 and 4. FIG. 3 is a block diagram depicting an arrangement of a modified example of the receiver device, and like components or equivalents with respect to FIG. 1 are denoted with like reference numerals.

The present modified example of the receiver device relates to a receiver device for receiving incoming radio waves by a complex antenna composed of a first antenna ANTa and a second antenna ANTb, placed in close proximity to each other, for specifically receiving incoming radio waves having different polarization characteristics.

For example, the present modified example of the receiver device relates to a receiver device for making it possible to receive both ground waves and satellite waves by using a complex antenna formed by placing a first antenna ANTa for receiving ground waves sent from a ground station (such as ground wave TV broadcast station) in close proximity to a second antenna ANTb for receiving satellite waves sent from a communications satellite like in a satellite broadcasting (BS).

Referring to FIG. 3, a switching unit 2 of the present receiver device is provided with a switching element 5 having two switching contacts Sa and Sb for supplying a reception signal Si from either of the two antennas ANTa and ANTb to a signal processing unit 1, and the switching operation of the switching element 5 is controlled through optimization process by a detecting unit 8 and a control unit 6, which will be discussed below. Also, the signal processing unit 1 includes a front end 3 for receiving the reception signal Si either from the antenna ANTa or ANTb through the switching element 5 and for converting the same into an intermediate frequency signal SIF applicable to signal processing, a decoding circuit 4 for decoding the intermediate frequency signal SIF outputted from the front end 3 so that an original signal Scv is restored.

A storage unit 7 pre-stores management data representing a correlation between the antennas ANTa and ANTb and the switching contacts Sa and Sb of the switching element 5, predetermined threshold data THDa and THDb which the control 6 uses as a criterion when performing the optimization process, and data representing antenna gains of the respective antennas ANTa and ANTb.

Next, the following description will describe, with reference to the flowchart of FIG. 4, an operation of the present modified example of the receiver device when performing the optimization process. For an easy explanation, when receiving ground waves, the first antenna ANTa (high gain antenna) has a higher antenna gain than the second antenna ANTb, and when receiving satellite waves, the second antenna ANTb (high gain antenna) has a higher antenna gain than the first antenna ANTa.

In other words, the following description will describe a case where it is determined in advance that either the first antenna ANTa or the second antenna ANTb serves as the high gain antenna or low gain antenna, depending on which of radio waves having different polarization characteristics is being received.

With referring to FIG. 4, the present receiver device is activated when the user or the like turns on the power thereof, and initially in Step S200, the control unit 6 sets the receiver device in a condition so that it can receive reception radio waves from a broadcast station the user or the like has selected. In other words, upon receipt of a command to receive ground waves, the control unit 6 switches on the switching contact Sa of the switching element 5, so that the first antenna ANTa serving as the high gain antenna for ground waves is selected as a receiving antenna.

Then, at Step S202, the detecting unit 8 detects the reception level of the receiving antenna, and the control unit 6 judges whether a reception condition thereof is stable or not. In other words, in case that the currently set receiving antenna is the first antenna ANTa to receive ground waves, the detecting unit 8 detects the reception level of the first antenna ANTa, and further, the control unit 6 examines the detection result from the detecting unit 8 to judge whether the reception condition is stable or not.

Herein, in the case where the reception level of the receiving antenna varies significantly in a short time, that is, when the reception level becomes discontinuous in a short time (varies significantly or the like), the control unit 6 determines that the reception condition is unstable. On the other hand, when the reception level of the receiving antenna is maintained at a predetermined level, the control unit 6 determines that the reception condition is stable.

Also, it should be noted that the control unit 6 judges only whether a reception condition of the receiving antenna (antenna ANTa while ground waves are being received) is satisfactory or not, and it never judges a reception condition of the other antenna (antenna ANTb while ground waves are being received). In other words, because the antennas ANTa and ANTb are provided in close proximity to each other, the control unit 6 judges receiving conditions of both the first and second antennas ANTa and ANTb by merely judging a reception condition of the currently set receiving antenna.

Upon determining that the reception condition is unstable (in case of NO), the control unit 6 skips to Step S224 without performing the optimization process, and repeats the procedure from Step S202 when a predetermined time set in advance has passed.

On the other hand, upon determining that the reception condition is stable in Step S202 (in case of YES), the control unit 6 proceeds to Step S204 and beyond to select an optimal antenna.

In Step S204, the control unit 6 compares a reception level AH of the receiving antenna (antenna ANTa while ground waves are being received) with the first threshold THDa. Then, the control unit 6 proceeds to Step S206 and judges whether the reception level AH is higher than the first threshold THDa.

Here, in the case where satisfactory audio reproduction or video reproduction is possible by a reproduction signal Scv outputted from the signal processing unit 1, the first threshold THDa is set to a level higher than the lowest in the reception levels of the respective antennas ANTa and ANTb. In other words, the first threshold THDa is set to a level higher than a reception level at which, of all the reception powers extracted from the respective antennas ANTa, ANTb (using the signal processing unit 1 as a load), the lowest reception power allowing satisfactory audio reproduction or video reproduction is achieved. In fact, the first threshold THD1 is predetermined empirically.

In other words, the first threshold THDa is set to a level higher than a reception level at which, of the reception powers extracted from the respective antennas ANTa and ANTb by using the signal processing unit 1 as a load, the lowest reception power for allowing satisfactory audio reproduction or video reproduction is achieved, and it is predetermined empirically.

Then, in case that the reception level AH is lower than the first threshold THDa (in case of NO), the control unit 6 proceeds to Step S208, and maintains the currently set receiving antenna as the receiving antenna, after which the control unit 6 skips to Step S224. In other words, in case that the currently set receiving antenna is the first antenna ANTa to receive ground waves and the reception level AH has a level lower than THDa, the control unit 6 maintains the current receiving antenna (first antenna ANTa) as the receiving antenna, after which the control unit 6 skips to Step S224.

On the other hand, in case that THDa≦AH in Step S206 (in case of YES), the control unit 6 proceeds to Step S210 and, by assuming the other antenna as being a candidate for the receiving antenna (referred to as the candidate antenna), switch the switching contact of the switching element 5 to the candidate antenna side.

In other words, in the case where THDa≦AH is determined at Step S206 while the first antenna ANTa serves as the receiving antenna and is receiving ground waves, this means there is a higher possibility that the signal processing unit 1 will receive a reception signal having a relatively high level with respect to the maximum input level of the signal processing unit 1. Hence, the other antenna (second antenna ANTb for receiving a satellite broadcasting signal) as an antenna having a low gain for ground waves is selected as a candidate antenna, and the connection is switched so that ground waves are received by the second antenna ANTb. Consequently, a level of a reception signal inputted to the signal processing unit 1 from the second antenna ANTb is lowered, whereby a level of the reception signal is adjusted to an adequate level for the maximum input level of the signal processing unit 1.

Then, in Step S212, the detecting unit 8 and the control unit 6 perform the same process as that in Step S202, whereby the control unit 6 judges whether a reception condition of the candidate antenna is stable or not. Here, in the case where the reception condition is not stable (in case of NO), the control unit 6 proceeds to Step S214, and stops setting the candidate antenna as the receiving antenna, and maintains the previous antenna before the switching as the receiving antenna, after which the control unit 6 skips to Step S224.

In other words, in the case where the candidate antenna is the second antenna ANTb, the control unit 6 switches on the switching contact Sa of the switching element 5, so that ground waves are received continuously by the previous antenna before the switching (that is, the first antenna ANTa).

In the case where a reception condition of the candidate antenna is stable in Step S212 (in the case of YES), the control unit proceeds to Step S216. Then, the control unit 6 compares a reception level AL of the candidate antenna with the second threshold THDb, and further, the control unit 6 proceeds to Step S218, and determines whether THDb>AL.

Herein, in the case of THDb≦AL (in case of NO), the control unit 6 proceeds to Step S220, and switches the switching contact of the switching element 5 to set the candidate antenna as the receiving antenna, after which the control unit 6 skips to Step S224. In other words, when the second antenna ANTb is selected as the candidate antenna and the reception level AL is higher than the second threshold THDb, the control unit 6 sets the second antenna ANTb as the reception signal at Step S220.

On the other hand, upon determining THD2>AL at Step S218 (in case of YES), the control unit 6 proceeds to Step S222, and controls the switching operation of the switching element 5 to set the previous antenna before the switching as the receiving antenna. In other words, when the second antenna ANTb is selected as the candidate antenna and the reception level AL is lower than the second threshold THDb, the control unit 6 sets the first antenna ANTa as the receiving antenna at Step S222, after which the control unit proceeds to Step S224.

Then, in Step S224, the control unit 6 determines a lapse of a predetermined time to periodically perform the optimization process detailed in Steps S202 through S222 as above, and repeats the procedure from Step S202.

As has been discussed, the modified example of the receiver device is so formed that, when a stable reception condition is achieved and a reception level higher than the first threshold THDa is obtained for radio waves being received, the receiver device selects the other antenna (the antenna having a low gain for the radio waves being received) as the candidate antenna instead of the currently set receiving antenna, and further, when a stable reception condition is achieved and a reception level higher than the second threshold THDb is obtained by receiving the radio waves through the candidate antenna, the receiver device switches to the candidate antenna as the receiving antenna.

As has been discussed, by setting the other antenna (which does not correspond to radio waves to be received) as the receiving antenna, the antenna having low reception efficiency is selected, which can improve the maximum input sensitivity of the receiver device, thereby allowing the signal processing unit 1 to reproduce a signal which will not cause noises, waveform distortion, sound cutting, etc.

For example, in the event of receiving strong ground waves near a transmitting antenna of a broadcast station, by setting the second antenna ANTb (having a low antenna gain for ground waves) as the receiving antenna, it is possible to improve the maximum input sensitivity while maintaining a satisfactory reception condition.

In addition, in case that a satisfactory reception condition is not achieved, for example, when a reception condition is not stabilized, it is allowed not to set the candidate antenna (antenna with a low gain) as the receiving antenna. In other words, by setting the antenna (provided specifically for radio waves to be received, for example, the first antenna ANTa for receiving ground waves) as the receiving antenna, it is possible to maintain a satisfactory reception condition.

In addition, because whether the reception conditions of both the first and second antennas are satisfactory or not is checked by merely judging a reception condition of the receiving antenna in Step S202, the optimization process can be accelerated.

The above description described a typical receiver device using a complex antenna including the first antenna ANTa for receiving ground waves and the second antenna ANTb for receiving satellite waves. It should be appreciated, however, that the first and second antennas ANTa and ANTb are not limited to those for receiving ground waves and satellite waves.

In the case where the antennas ANTa and ANTb receive radio waves having different patterns (for example, their polarization characteristics are different from one another), it is possible to employ the receiver device of the present invention, irrespective of whether they are ground waves or satellite waves.

For example, in the case where the first antenna ANTa is set to receive circularly polarized ground waves and the second antenna ANTb is set to receive other polarized (linearly polarized, elliptically polarized, etc.) ground waves, it is possible to receive ground waves in a satisfactory reception condition while improving the maximum input sensitivity.

Also, the receiver devices shown in FIGS. 1 and 3 are provided to judge whether a reception condition is satisfactory or not, based on the reception levels of the respective antennas ANT1 through ANTn or the respective antennas ANTa and ANTb. However, they may also be formed in such a manner that whether a reception condition is satisfactory or not is judged by checking a waveform of the reproduction signal Scv or using other parameters, such as a decoding error.

As has been discussed, according to the receiver device of the present invention, in a receiver device for receiving incoming radio waves by using a plurality of antennas, the receiver device switches to an antenna (having the lower antenna gain) as a new receiving antenna, so that a reception level of this particular antenna becomes the maximum input level of the signal processor. In this way, it is possible to provide a reception device that can improve the maximum input sensitivity and forestall the occurrence of waveform distortion and the like.

Also, in a receiver device for receiving incoming radio waves by using a plurality of antennas provided in close proximity to each other, the receiver device switches to an antenna having the lower antenna gain as a new receiving antenna, so that a reception level of this particular antenna becomes the maximum input level of the signal processor. In this way, it is possible to provide a receiver device which can improve the maximum input sensitivity and forestall the occurrence of waveform distortion and the like.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A receiver device comprising:
   a plurality of antennas having different antenna gains;
   an antenna switching device for selecting one of reception signals received by the plurality of antennas, and supplying the selected reception signal to a signal processor arranged subsequent to the antenna switching device;
   a detector for detecting the level of a reception signal from each antenna; and
   a controller for controlling the antenna switching device for selecting a reception signal having a lower level than a maximum input level of the signal processor, in accordance with detection result from the detector,
   wherein the controller operates to control the antenna switching device, in a manner such that once the level of a reception signal supplied to the signal processor becomes lower than a predetermined level, an antenna having a higher antenna gain than that of an antenna being selected is selected,
   wherein the controller has a judger for judging a reception state of each antenna; and
   when there are a plurality of antennas capable of receiving signals without any troubles, the antenna switching device is controlled so as to select a reception signal from an antenna having a low antenna gain.

2. A receiver device according to claim 1,
   wherein the plurality of antennas are located close to one another,
   wherein the controller operates to control the antenna switching device, in a manner such that once the level of a reception signal supplied to the signal processor approaches a maximum input level of the signal processor, an antenna having a lower antenna gain than that of an antenna being selected is selected.

3. A receiver device according to claim 1,
   wherein the controller operates to control the antenna switching device, in a manner such that once a reception signal of each antenna becomes lower than a predetermined level, a reception signal from an antenna having a high antenna gain is selected, and that when there are plurality of reception signals having a higher level than the predetermined level, a reception signal from an antenna having a low antenna gain is selected.

4. A method for selecting a receiving antenna in a receiving device, comprising:
   detecting the level of a reception signal from each antenna in a plurality of antennas;
   based on the detection result from the detector, selecting one antenna from the plurality of antennas, the reception signal from the selected antenna having a lower level than a maximum input level of a signal processor;
   supplying the reception signal from the selected antenna to the signal processor;
   controlling the antenna switching device, in a manner such that once the level of a reception signal supplied to the signal processor becomes lower than a predetermined level, an antenna having a higher antenna gain than that of an antenna being selected is selected, wherein the controller has a judge for judging a reception state of each antenna; and
   controlling the antenna switch device in a manner such that when there are a plurality of antennas capable of receiving signals without any troubles, a reception signal from an antenna having a low antenna gain is selected.

* * * * *